United States Patent Office 3,457,327
Patented July 22, 1969

3,457,327
POLYURETHANE COMPOSITION CONTAINING AMINO-ACETALIZED POLYVINYL ALCOHOL
Kanji Matsubayashi and Kazuo Noda, Kurashiki, Japan, assignors to Kurashiki Rayon Co., Ltd., Kurashiki, Japan
No Drawing. Continuation-in-part of application Ser. No. 403,336, Oct. 12, 1964. This application Aug. 28, 1967, Ser. No. 663,560
Claims priority, application Japan, Oct. 23, 1963, 38/56,744
Int. Cl. C08g 41/04; C08f 29/32
U.S. Cl. 260—859          7 Claims

ABSTRACT OF THE DISCLOSURE

Light resistance of polyurethane composition is improved by adding 0.1 to 50% by weight based on the polyurethane elastomer of an amino acetalized product of polyvinyl alcohol with an amino-aldehyde selected from the group consisting of β-aminobutylaldehyde, β-cyclohexyl aminobutylaldehyde, β-dimethylaminopivaldehyde, β-diethylaminopivaldehyde, phenylaminopivaldehyde, dinonylpivaldehyde, dodecylaminopivaldehyde, p-aminobenzaldehyde and p-dimethylaminobenzaldehyde, said amino acetalized product having less than 80 mol percent of vinyl alcohol unit in the molecule of said product.

---

This application is a continuation in part of our copending application Ser. No. 403,336, Polyurethane Composition Having Superior Light Resistance and Mechanical Properties filed Oct. 12, 1964, and now abandoned.

The object of the invention is to provide polyurethane elastomeric composition which can be shaped to filaments and films having excellent height resistance and also may be applied to binders, adhesives and painting materials.

Hitherto known polyurethane elastomers using diamines, or diols, as chain extender have defects that the mechanical properties are considerably reduced by sun light or ultraviolet irradiation and that the white polymers change to yellow or yellow brown color. In order to prevent such defects, various attempts to improve the light resistance have hitherto been tried by adding various kinds of addition agent, but fully acceptable results have not been obtained.

The inventors have found that by adding, into the elastomers, polyvinyl amino acetals which consist of vinyl alcohol $$-CH_2-CH-$$
$$\phantom{-CH_2-}|$$
$$\phantom{-CH_2-}OH$$

units and amino acetalized divinyl alcohol $$-CH_2-CH-CH_2-CH-$$
$$\phantom{-CH_2-C}|\phantom{H-CH_2-C}|$$
$$\phantom{-CH_2-C}O-CH-O$$
$$\phantom{-CH_2-CH-CH_2-}|$$
$$\phantom{-CH_2-CH-CH_2-}R(N)$$

units, wherein R(N) is a residual group of the aminoaldehydes selected from the group consisting of β-aminobutylaldehyde, β-cyclohexyl aminobutylaldehyde, β-dimethylaminopivaldehyde, β-diethylaminopivaldehyde, phenylaminopivaldehyde, dinonyl-aminopivaldehyde, dodecylaminopivaldehyde, p-aminobenzaldehyde, and p-dimethylaminobenzaldehyde; or the derivatives thereof, which consist of a part of said vinyl alcohol units being substituted with vinyl acetate, divinyl formal, divinyl acetal, divinyl butylal, divinyl nonylal and divinyl benzal, the remarkable improvement in the resistances to photo degradation and yellow discoloration by light can be attained and also there is no reduction in mechanical properties as in the case of addition of hitherto known addition agents. The practice of the invention also resulted in especially high fastness to washing and sun light and long durability as light resistant stabilizer and it gives fiber forming ability so that the fibers and films made of polyurethane have improved mechanical properties.

The function and effect of the invention will be explained in detail by means of the examples.

The sample (A) added to the spinning solution containing 15 parts of polyester urethane consisting of polyethylene propylene adipate, (the molar ratio of ethylene to propylene is 0.7 to 0.3) of molecular weight 1,500 having hydroxy groups at both ends, p·p'-diphenyl methane diisocyanate and ethylene glycol (the molar ratio of polyester, diisocyanate and glycol is 1:2.5:1.5), 45 parts of dimethyl formamide and 0.075 part of titanium dioxide (the delusterant), 5 weight percent, based on said polyester urethane, of formalized polyvinyl alcohol (formalization degree: 60 mol percent) and 10 percent dimethyl formamide formamide solution; the sample (B) added with 5 weight percent, based on said polyester urethane, of butyralized polyvinyl alcohol (butyralization degree: 55 mol percent); the sample (C) added with 5 weight percent, based on said polyester urethane, of β-cyclohexyl aminobutyralized polyvinyl alcohol (β-cyclohexyl aminobutyralization degree: 9 mol percent, and a half of the residual vinyl alcohol units are substituted with vinyl acetate units) and sample (D) added with 5 weight percent, based on the polyester urethane, of β-dimethyl aminopivalized polyvinyl alcohol (β-dimethyl aminopivalization degree: 15 mol percent, and 40 mol percent of the residual vinyl alcohol units are substituted with vinyl acetate units) are wet-spun to provide elastic filaments, and the relations between the changes of tenacity, coloration of the samples measured by the unaided eyes and the photometer, and the time of ultraviolet irradiation are shown in the following table:

| | Sample A | | | Sample B | | | Sample C | | | Sample D | | |
|---|---|---|---|---|---|---|---|---|---|---|---|---|
| | | Coloration | | | Coloration | | | Coloration | | | Coloration | |
| Irradiation time (hrs.) | Tenacity (g./d.) | Unaided eyes | Y.I.[1] | Tenacity (g./d.) | Unaided eyes | Y.I.[1] | Tenacity (g./d.) | Unaided eyes | Y.I.[1] | Tenacity (g./d.) | Unaided eyes | Y.I.[1] |
| 0 | 0.67 | White | 2 | 0.72 | White | 3 | 0.67 | White | 2 | 0.65 | White | 2 |
| 5 | 0.63 | Light yellow. | 7 | 0.68 | Light yellow. | 10 | 0.66 | do | 3 | 0.65 | do | 3 |
| 40 | 0.59 | Yellow | 21 | 0.63 | Yellow | 25 | 0.63 | do | 5 | 0.62 | do | 4 |
| 100 | 0.49 | Yellow brown. | 34 | 0.54 | Yellow brown. | 38 | 0 59 | Light yellow. | 8 | 0.60 | Light yellow. | 10 |

[1] Y.I. is an abridgement of Yellow Index, which is obtained by the following equation, $$Y.I. = 70 \times \left(1 - \frac{\text{reflective ratio at 455 m}\mu}{\text{reflective ratio at 557 m}\mu}\right)$$

wherein each reflective ratio is measured by the photometer using the characteristic ray wave length of 455 mµ and 577 mµ. An increase in the Yellow Index means that the coloration of the sample is increased.

As is apparent from the above table, samples (c) and (d), which comprise the photostabilizers of the present invention are superior to the samples (A) and (B), which comprise the known photostabilizers, on the point of the coloration with the ultraviolet irradiation.

The linear polyurethane elastomers having no free NCO groups used in the present invention are produced from the reaction between the three ingredients described as follows:

(1) Polyglycol having hydroxyl group at both ends and having an average molecular weight of 500 to 5,000.

(2) Organic diisocyanate having 2 isocyanate groups in the molecule.

(3) Bifunctional chain extender such as diamine, diol and the like.

As polyglycols described in (1), polyester, polyether, polyether ester, polyacetal, and polyoxysilane are preferable. As polyester, those obtained by polycondensation of adipic acid, sebacic acid, maleic acid and the like aliphatic dicarboxylic acid and ethylene glycol, propylene glycol, butylene glycol, hexamethylene glycol and the like aliphatic glycols, and those obtained by the reaction of lactone containing at least 2 carbon atoms in the ring such as ε-caprolactone, β-propiclactone of mixtures thereof with bi-functional extender such as ethylene glycol and having hydroxyl groups at both ends are preferable. As polyethers, polyalkylene glycols such as polyethylene glycol, polypropylene glycol, and polybutylene glycol are preferable. A copolymer of cyclic lactones such as caprolactone and the cyclic ethers such as propylene oxide and the polyether ester such as polycondensates of diethylene glycol and adipic acid are also well adapted. A mixtuer of more than two kinds of polyhydroxy compounds may also be used.

As organic diisocyanates, aromatic diisocyanates such as naphthylene diisocyanate, p,p'-benzidine diisocyanate, p,p'-diphenylmethane diisocyanate, phenylene diisocyanate, 2,4-(or 2,6)-tolylene diisocyanate, durene diisocyanate, 3,3',5,5'-tetramethyl-diphenylmethane-4,4'-diisocyanate are preferable, and also aliphatic diisocyanates such as hexamethylene diisocyanate may be used. If desired, polyisocyanates having more than three isocyanate groups may be used.

As bifunctional chain extenders described in (3), compounds having at least two active hydrogen groups in each molecule such as p,p'-methylenedianiline, diaminodurene, 4,4'-diamino-3,3', 5,5'-tetramethylenediphenylmethane and the like aromatic diamines, and aliphatic amines such as hydrazine, ethylenediamine, propylenediamine, hexamethylenediamine, piperazine, 2,5-dimethylpiperazine, or aliphatic glycols such as ethylene glycol, propylene glycol and diol extender such as bisphenol-A, and the like diphenylalkanes are preferable. Amino alcohols such as water, ethanolamine, and polyamines, polyols having more than trifunctional groups may be used.

The polyurethane compositions of the invention consist mainly of said polyurethane and contain more than 0.1 weight percent, based on the polyurethane, of polyvinyl amino acetals or derivatives thereof, and further, if desired, aromatic amines, inorganic chemicals or ultraviolet ray absorbing agent or the like stabilizer.

The polyvinyl amino acetals used in this invention are made from the reaction between polyvinyl alcohol and an amino-aldehyde selected from the group consisting of β-aminobutyl aldehyde, β-cyclohexyl aminobutyl aldehyde, β-dimethyl aminopivaldehyde, β-diethylaminopivaldehyde, phenylaminopivaldehyde dinonylaminopivaldehyde, dodecyl aminopivaldehyde, P-aminobenzaldehyde, and P-dimethylaminobenzaldehyde. One of the derivatives of polyvinyl amino acetals used in this invention is made from the reaction described above, instead of polyvinyl alcohol, the partially saponified polyvinyl acetate is used. Other derivatives of polyvinyl amino acetals used in this invention are introduced from the further acetalization of polyvinyl aminoacetals with aldehydes, whicch do not contain amino groups in the molecule, such as, formaldehyde, acetaldehyde, butylaldehyde, nonylaldehyde or benzaldehyde. These acetalization reactions are effectively promoted under acidic conditions. These polyvinyl amino acetals having vinyl alcohol unit and amino acetalized divinyl alcohol units, are produced from the reaction between vinyl alcohol units and the amino aldehydes. The residual vinyl alcohol units are converted by further acetalization with non-aminoaldehydes to divinyl formal units, divinyl acetal units etc. When the partially saponified polyvinyl acetate is used instead of polyvinyl alcohol, which is a fully saponified polyvinyl acetate, vinyl acetate units still remain in the molecule of the derivatives of the polyvinyl amino acetals.

These polyvinyl amino acetals and the derivatives thereof, which may be made into shaped articles such as fibers which are insoluble in water and soluble in an organic solvent, and also those having secondary transition points of less than 50° C. preferably lower than room temperature, are most suitable. The degree of polymerization of less than 5,000 and above 50 is suitable.

The invention is not limited to the above range. For instance, when the addition quantity is less than 5% and the light resistance is to be improved, low polymerization degree and low secondary transition point are not necessary, but at more than 20% addition a low secondary transition point is necessary, otherwise it causes deterioration of some mechanical properties such as increase of permanent set and lowering of elongation. Solubility in organic solvents is not necessary in case of melt spinning and extrusion and injecting molding, yet in usual dry spinning and wet spinning it is preferable to be soluble in organic solvents.

As characteristics of the invention, the remarkable improvements in wash fastness and sun light resistance may be pointed out, the dye absorption of the mixed spun fibers according to the method of the invention is different from that in case of fibres of polyurethane elastomer only.

On the other hand,, the improvements in mechanical properties can be attained only when the polyvinyl amino acetals have fiber forming ability and a lower secondary transition point. To this end it is preferable that the polyvinyl alcohol raw material for making the polyvinyl amino acetals should have sufficiently high polymerization degree of more than 50, and less than 80 mol percent of vinyl alcohol in polyvinyl amino acetals. By mixing the above polyvinyl amino acetals or derivatives thereof its contribution appears at a point near about the high elongation and breaking without affecting the elasticity at lower elongation to provide the superior property of attaining high strength. The addition quantity is suitable at more than 0.1% and less than 50% of the total polymer, more preferably more than 5% for the improvement of mechanical properties. But, for the purpose of adhesives, binders and painting materials water soluble polyvinyl amino acetals or derivatives thereof are of course useful.

Two or more kinds of above described derivatives thereof may be used and by the mere addition of such polyvinyl amino acetals or derivatives thereof the light resistance of polyurethane elastomer is remarkably improved. Furthermore, by using in parallel aromatic N-containing cyclic amines, and other aromatic amines, silicon dioxide, lead oxide, titanium oxide and the like metal oxides, or acetate, formate, oxalate, chloride, fluorate and the like metal salts of Cp, Mn, Cu and Ni, and also absorbing agents for ultraviolet rays such as O-hydroxybenzophenone compounds, gallic acid esters the light resistance can be further improved.

The properties of the polyurethane compositions containing polyvinyl amino acetals or the derivatives thereof other stabilizers are explained by the following examples together with the properties of polyurethanes of similar composition not containing PVA for the sake of comparison. The "part" and "percent" in the examples mean weight part and weight percent.

EXAMPLE 1

Polyethylene propylene (0.7:0.3 mol) adipate having hydroxyl group at both ends and having molecular weight of 1,100, p,p'-diphenylmethane diisocyanate, and ethylene glycol (molar ratio 1:2.5:1.5) were reacted at a temperature of 140° C. for 5 hours, 15 parts of polyester urethane thus obtained were crushed into powder and dissolved in 28 parts of dimethylformamide and added with 0.075 part of delusterant (titanium oxide) to provide a viscous spinning solution, to which were added 10% of p-aminobenzalized polyvinyl alcohol (polymerization degree of polyvinyl alcohol:1,700, p-aminobenzalization degree of 20 mol percent based on polyurethane dissolved in 10% of dimethylformamide and 0.5% of 2,6-dibenzoyl resorcinol as ultraviolet ray absorber and the solution was extruded in air at 180° C. and taken up at a rate of 200 m./min. and the properties of the fiber thus obtained by the dry spinning process are shown in Table 1. As for comparison the properties of polyurethane elastomer fiber of similar composition not containing PVA derivatives and others are shown therein by comparing the effects of irradiating ultraviolet ray.

TABLE 1

| Sample | Before irradiation | | After irradiation of ultraviolet ray for 40 hours | | |
|---|---|---|---|---|---|
| | Tenacity (g./d.) | Elongation (percent) | Residual tenacity (percent) | Residual elongation (percent) | Color |
| The invention | 0.58 | 480 | 92 | 95 | Light yellow. |
| Contrast | 0.47 | 490 | 16 | 31 | Yellow. |

EXAMPLE 2

110 parts of polyester glycol having average molecular weight of 1,380 and having hydroxyl group at both ends obtained by polycondensation of ethylene glycol, propylene glycol (0.7:0.3 mol) and adipic acid, and 40 parts of p,p'-diphenylmethane diisocyanate were reacted at 85° C. for 1 hour to provide a prepolymer having isocyanate at both ends which was dissolved in 315 parts of dimethylformamide and added with a solution of 12.6 parts of p,p'-methylenedianiline dissolved in 335 parts of dimethylformamide at 0° C., after stirring for 30 minutes the solution was stirred again for 1 hour at room temperature. To the viscous polymer solution thus obtained was added 0.8 part of delusterant (titanium oxide), 15% based on polyurethane, of the polyvinyl alcohol mixed acetalized with p-dimethyl aminobenzaldehyde and formaldehyde (aminobenzalization degree of 13.5 mol percent and formalization degree of 46 mol percent as dimethylformamide solution, and the solution thus obtained was wet spun into water at room temperature, the properties of the fiber thus obtained and the effect of irradiation of ultraviolet ray are shown in Table 2.

TABLE 2

| Sample | Before irradiation | | After irradiation of ultraviolet ray for 40 hours | | |
|---|---|---|---|---|---|
| | Tenacity (g./d.) | Elongation (percent) | Residual tenacity (percent) | Residual elongation (percent) | Color |
| The invention | 0.59 | 655 | 91 | 96 | White. |
| Contrast | 0.54 | 650 | 26 | 38 | Yellow brown. |

The same solution was extruded as a film, and after irradiation with ultraviolet rays for 40 hours was tested and substantially no coloring was recognized in the polyurethane film containing PVA derivative, whereas the color of the contrast sample was changed to yellow brown.

EXAMPLE 3

Dimethylformamide solution of polyurethane having the same composition as described in Example 2 added with 10% dimethylformamide solution of 5% based on polyurethane of phenylaminopivalized and formalized polyvinyl alcohol (pivalization degree of 12.5 mol percent and formalization degree of 40 mol percent and 1% based on polyurethane, isoamyl gallate was wet spun in the same manner as in Example 2 to obtain elastic fibers having the properties shown in Table 3.

TABLE 3

| Sample | Before irradiation | | After irradiation of ultraviolet ray for 40 hours | | |
|---|---|---|---|---|---|
| | Tenacity (g./d.) | Elongation (percent) | Residual tenacity (percent) | Residual elongation (percent) | Color |
| The invention | 0.61 | 640 | 98 | 94 | White. |
| Contrast | 0.54 | 650 | 26 | 38 | Yellow brown. |

EXAMPLE 4

Polytetramethylene glycol having hydroxyl group at both ends and having molecular weight of 1,100, p,p'-diphenylmethane diisocyanate and ethylene glycol were reacted at 140° C. for 5 hours, 15 parts of polyether urethane thus obtained were crushed into powder and dissolved in 45 parts of dimethylformamide and added to acetalized polyvinyl alcohol acetalized with β-cyclohexyl aminobutylaldehyde and then acetalized with formaldehyde (aminoacetalization degree of 12.7 mol percent and formalization degree of 64.4 mol percent) as 10% solution in 10% dimethylformamide based on polyurethane, and the solution thus obtained was wet spun into water at the room temperature and obtained the elastic fiber as shown in Table 4.

TABLE 4

| Sample | Before irradiation | | After irradiation of ultraviolet ray for 40 hours | | |
|---|---|---|---|---|---|
| | Tenacity (g./d.) | Elongation (percent) | Residual tenacity (percent) | Residual elongation (percent) | Color |
| The invention | 0.81 | 800 | 98 | 106 | White. |
| Contrast | 0.67 | 810 | 25 | 38 | Yellow. |

The above samples were subjected to dyeing test with Irgaran Brown 2RL (C.I. Acid Brown 45) which is a kind of complex salt dyestuff and Acid Brilliant Scarlet 3R (C.I. Acid Red 18). The results are shown in Table 8 which shows that the sample of the invention has good dyeing affinity and fastness.

TABLE 5

| Sample | Complex salt dyestuff | | | Acid dyestuff | | |
|---|---|---|---|---|---|---|
| | Dye absorption (mg./g.) | Wash [1] fastness (percent) | Sun light fastness (class) | Dye absorption (mg./g.) | Wash [1] fastness (percent) | Sunlight fastness (class) |
| The invention | 19.7 | 1 | 6 | 20.0 | 1 | 4 |
| Contrast | 18.7 | 5 | 3 | 0 | | |

[1] Decoloring quantity by soaping/former dyed quantity (%).

EXAMPLE 5

Polyurethane dimethylformamide solution having the same composition as that of Example 1 was added with 50% of the partially saponified polyvinyl acetate (polymerization degree of 500, and saponification degree of 50%) acetalized with β-cyclohexyl aminobutylaldehyde (acetalization degree of 8.7%) and the solution thus prepared was dry spun into air at 180° C. in the similar manner to that of Example 1 to obtain an elastic fiber having the properties shown in Table 6.

TABLE 6

| Sample | Before irradiation | | After irradiation of ultraviolet ray for 40 hours | | |
|---|---|---|---|---|---|
| | Tenacity (g./d.) | Elongation (percent) | Residual tenacity (percent) | Residual elongation (percent) | Color |
| The invention | 0.42 | 475 | 97 | 99 | White. |
| Contrast | 0.47 | 490 | 16 | 31 | Yellow brown. |

We claim:

1. A uniformly mixed polyurethane composition having excellent light resistance and mechanical properties and retaining the elasticity of polyurethane elastomer, which comprises a physical mixture of (1) linear polyurethane elastomer having no free-NCO groups obtained by reacting polyglycol having a molecular weight of 500 to 5,000 and hydroxyl groups at both ends, chain extender selected from the group consisting of diols and diamines, and organic diisocyanate having—NCO groups equivalent to sum of active hydrogens in said polyglycol and said chain extender, and (2) 0.1 to 50% by weight based on said elastomer of an amino-acetalized product of polyvinyl alcohol with an aldehyde selected from the group consisting of β-aminobutylaldehyde, β-cyclohexylaminobutylaldehyde, β-dimethylaminopivaldehyde, β-diethylaminopivaldehyde, dinonylpivaldehyde, dodecylaminopivaldehyde, p-aminobenzaldehyde and p-dimethylaminobenzaldehyde, said amino acetalized product having less than 80 mol percent of vinyl alcohol units in the molecule.

2. A uniformly mixed polyurethane composition according to claim 1, wherein said aldehyde is p-aminobenzaldehyde.

3. A uniformly mixed polyurethane composition, according to claim 1, wherein said aldehyde is β-cyclohexylaminobutylaldehyde.

4. A uniformly mixed polyurethane composition, according to claim 1, wherein said aldehyde is β-dimethylaminopivaldehyde.

5. A shaped article prepared from the composition of claim 1.

6. Mixed spun fibers prepared from the composition of claim 1.

7. A film prepared from the composition of claim 1.

References Cited

UNITED STATES PATENTS

| 2,960,384 | 11/1960 | Osugi | 260—73 |
| 3,024,216 | 3/1962 | Smitmans | 260—859 |
| 3,077,462 | 2/1963 | Fitzhugh | 260—33.4 |
| 3,149,995 | 9/1964 | Bauer | 117—66 |

MURRAY TILLMAN, Primary Examiner

P. LIEBERMAN, Assistant Examiner

U.S. Cl. X.R.

260—41, 45.95, 73, 75, 77.5, 827